April 16, 1968  D. B. HORTON  3,378,237
FERTILIZER AGITATOR
Filed Dec. 15, 1966  3 Sheets-Sheet 2
*Fig. 2.*  *Fig. 4.*
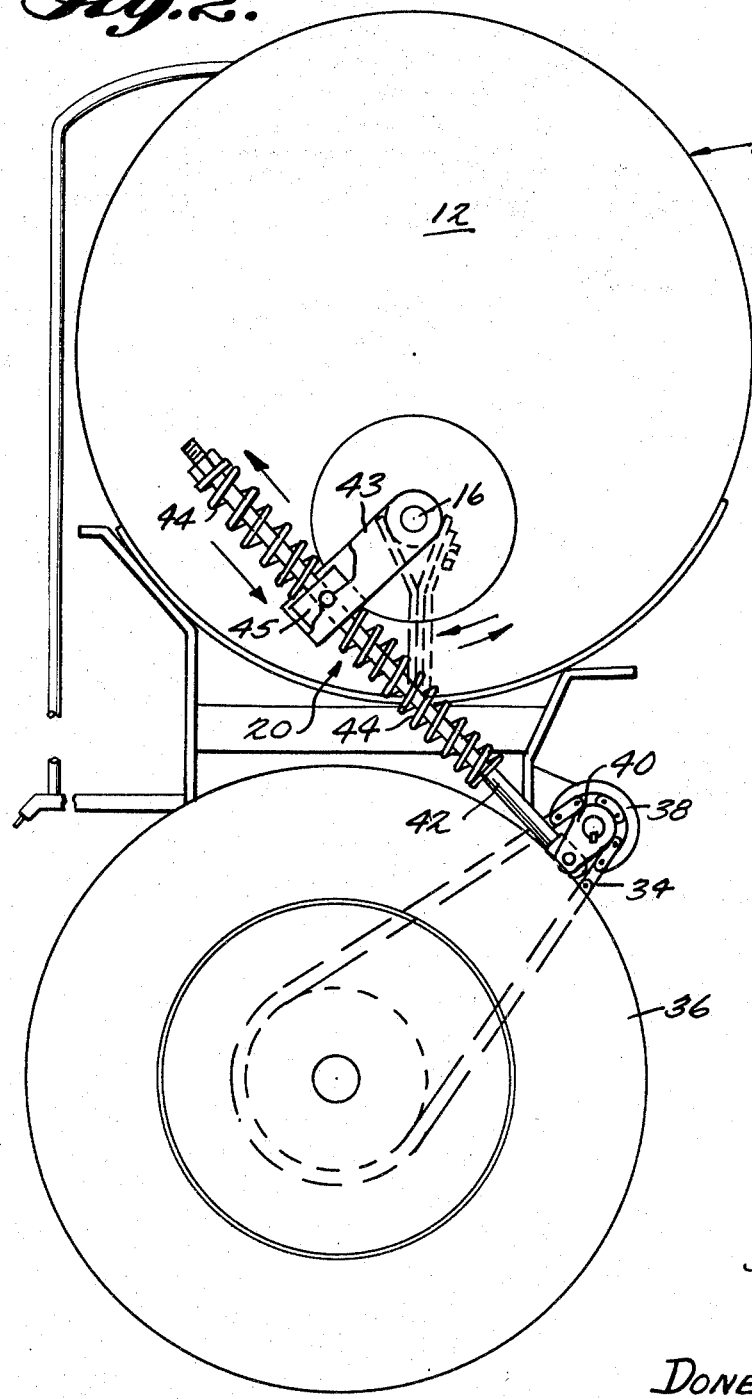
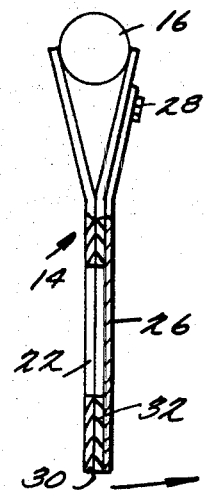
*Fig. 3.*
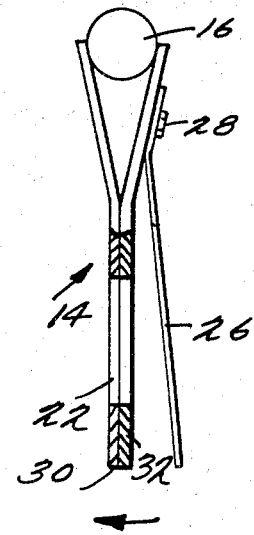
INVENTOR
DONELSON B. HORTON
BY Cushman, Darby & Cushman
ATTORNEYS April 16, 1968  D. B. HORTON  3,378,237
FERTILIZER AGITATOR
Filed Dec. 15, 1966  3 Sheets-Sheet 3

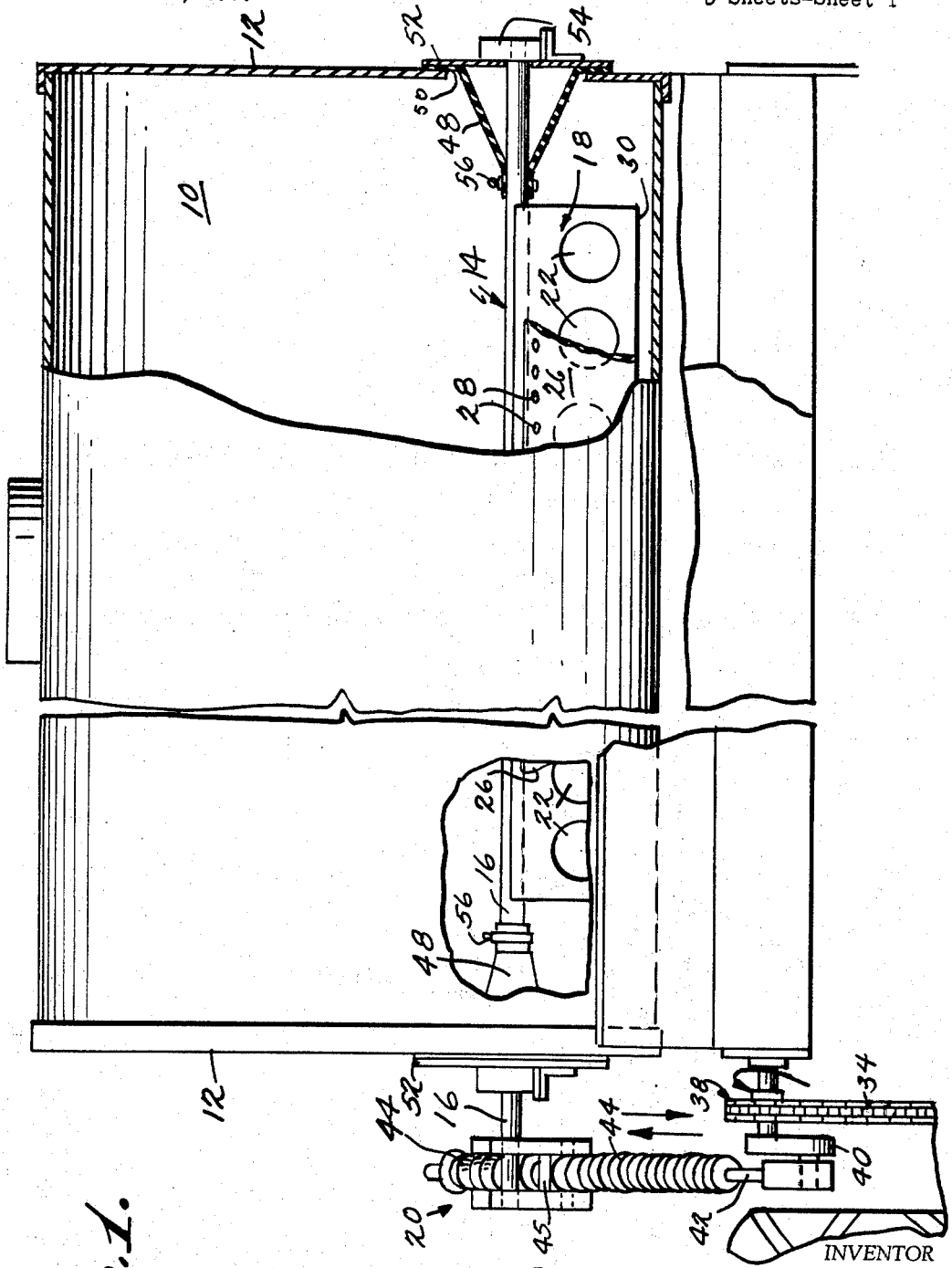

INVENTOR
DONELSON B. HORTON
BY Cushman, Darby & Cushman
ATTORNEYS

United States Patent Office 3,378,237
Patented Apr. 16, 1968

3,378,237
FERTILIZER AGITATOR
Donelson B. Horton, Madison, Ala., assignor to John Blue Company, Incorporated, Huntsville, Ala., a corporation of Alabama
Continuation-in-part of application Ser. No. 486,145, Sept. 9, 1965. This application Dec. 15, 1966, Ser. No. 609,978
13 Claims. (Cl. 259—101)

ABSTRACT OF THE DISCLOSURE

An agitator is provided for mixing liquid materials in tanks, and the agitator includes a vane and follower construction which is mounted to oscillate back and forth within a tank containing the material. The vane includes one or more openings through it, and the follower is mounted over one surface of the vane so as to open and close the openings formed through the vane. One embodiment of a vane and follower construction provides for a unique mounting of the follower on the vane so as to obtain an improved closing of the vane openings when the agitator is being used in very dense materials. There is also provided an improved driving means for driving the vane and follower combination within a tank, and the driving means is mounted externally of the tank. A sealing boot is provided for sealing a mounting shaft within the tank so that driving motions can be applied to the mounting shaft and to the vane carried thereon by the driving means located externally of the tank. This abstract is not intended to define the scope of the invention but is only provided to permit a cursory review of the gist of the invention.

Brief description of the invention

This invention is a continuation-in-part of my copending application Ser. No. 486,145, filed Sept. 9, 1965, now abandoned.

The invention relates to an agitator device for agitating and mixing materials in a liquid, and in particular, the invention is concerned with an agitator for mixing solid fertilizer materials in a liquid medium, such as water.

In preparing fertilizer materials for use and distribution at a field site, it is necessary to mix various materials which make up the particular fertilizer to be used. Additionally, it is necessary to maintain the fertilizer in a properly mixed state right up to the time that it is dispensed from spraying equipment onto the ground which is being treated. Recently, there has been a great amount of use of solid additives in liquid fertilizer mediums, and it is especially important that such additives to evenly mixed in a solution for dispensing at a field location. The solid additives which are being used are often not soluble in water or other liquid mediums, and therefore, a true solution does not exist when such additives are mixed into liquid mediums. Such mixtures are more properly described as slurries or suspensions of solid particles in liquid mediums, and it is important in agitating such mixtures to maintain an even dispersion of particles throughout the medium in order to prevent a settlement of solid particles prior to dispensing of the mixture onto the ground.

It is known in the prior art to provide for various mixing and agitating devices, and most often prior art constructions have required that an agitator device be introduced through the open top of a vessel in order to accomplish its agitating function. Also, it is known in the prior art to provide for vane and follower combinations which function as agitating means when oscillated back and forth within a material to be mixed, and a patent showing a general construction for an agitating vane is Place Patent 858,103. However, the prior art has not provided for a combined structure in an agitating device which is useful for being sealed within a tank and which can be driven by a driving means located externally of the tank. Further, it has been found that prior art vane and follower constructions do not operate reliably when very viscous materials are being mixed, and a novel arrangement has been devised by this invention for improving a vane and follower construction.

Accordingly, the present invention provides for a novel agitator device which is especially suitable for maintaining a fertilizer suspension in its proper mixed form within a tank which is to be carried to a field site. The tank may act as a reservoir for liquid fertilizer material at the field site, and in this capacity the tank may be mounted on a vehicle which includes spraying equipment for dispensing fertilizer from the tank and applying the same onto a field location. The invention provides a driving means for operating the agitator within the tank during an entire use of the tank at a field location.

In greater detail, the invention provides for a vane or paddle structure which may be oscillated back and forth within a tank and below a liquid level within the tank so as to mix and agitate component parts of a liquid mixture contained therein. The oscillating vane is mounted so as to traverse a substantial volume of the liquid medium, and a driving means is provided externally of the tank to move the vane back and forth so as to effect the agitating and mixing action. The vane is provided with one or more valving devices which permit liquid to flow through the vane as it moves in one direction through the liquid, while preventing a flow of liquid through the vane when it is moving in an opposite direction through the liquid. Various valving devices may be utilized, however, the invention contemplates the use of a structure wherein a plurality of openings are formed through a vane and a follower is mounted to cover the openings when the vane is moved in the described opposite direction.

Since it is contemplated that the agitator means of this invention will be incorporated in a fertilizer tank which is carried to a field location, it is necessary to provide a driving means external of the tank which will oscillate the vane back and forth within the tank. Any suitable eccentric driving linkage may be used to drive the agitator vane, and the linkage may be operated by a drive chain or other device which is connected to one of the wheels of the vehicle which is carrying the fertilizer tank. Where a stationary storage vessel or nurse tank is required, the linkage may be operated by a gasoline engine, electric motor or other power source. The mounting of the agitator vane within the tank includes a shaft which passes through the walls of the tank so as to be connected to the external driving means, and the shaft may be mounted through the walls in suitable passages having bearing structures for supporting the shaft for oscillating, rocking movement. Since the shaft passes through the tank walls at an underwater level in the tank, it is necessary that suitable sealing means be provided at each end of the shaft to prevent leakage of material out of the tank. Various sealing means may be utilized with this invention, but an improved sealing means has been devised in the form of a flexible boot which surrounds the ends of the shaft where those ends pass through the walls of the tank. The flexible boot is secured to the shaft itself and to an inside wall portion surrounding the exit of the shaft through the wall. The flexible boot completely prevents any leakage of liquid past the shaft or through the walls and also is sufficiently flexible to allow the shaft to rock back and forth in its normal oscillating movement to drive the vane. Thus the flexible sealing boots provide a completely effective seal having no separate parts which must move relative to one another and which would be affected by the corrosive nature of the fertilizer material.

In a further embodiment of the invention, an improved vane and follower construction is provided as an agitating means for use in very dense or viscous liquid materials. In prior art vane and follower constructions, the follower member is attached to the vane at points which are very close to the axis of rotation for the vane, and this arrangement permits a relatively free flapping action of the follower relative to the vane when it is oscillated back and forth. However, when such a construction is utilized in very viscous materials, it has been found that there is a tendency for the follower to remain in substantially a fixed position for close to 90 degrees of rotational movement of the vane. This fixing of position takes place when a vane has moved to a limit position for opening the follower and when the vane starts to oscillate in a second direction to close the follower. In viscous materials, the second direction of movement requires almost 90 degrees of rotational movement of the vane to effect a closing of the follower over openings in the vane because the vane must effectively move to the relatively fixed position of the follower. The improvement of this invention requires that the follower be attached substantially away from the axis of rotation for the vane and at some intermediate point between the axis of rotation and a terminal edge of the vane. With this arrangement it is possible to close the vane in approximately one-half the rotational distance required by prior art devices when a very viscous material is being mixed.

Although the invention is most suitable for mixing solid particles in a state of suspension in a liquid medium, it is contemplated that the apparatus of the invention is equally adaptable for mixing other fluids or liquids together, as required. Other advantages and features of this invention will become apparent in the more detailed discussion which follows and in that discussion reference will be made to the accompanying drawings in which:

FIGURE 1 is a longitudinal cross-sectional elevation of a fertilizer tank incorporating the agitator device of this invention;

FIGURE 2 is an end view of the outside of the fertilizer tank of FIGURE 1, showing an external driving means which oscillates a shaft and vane within the tank;

FIGURE 3 is a detailed cross-sectional elevation of a portion of a vane means which may be used with this invention and showing a follower in a position which opens openings through the vane;

FIGURE 4 is a cross-sectional elevation similar to FIGURE 3 showing the follower means in a closed position relative to the openings contained through the illustrated vane means;

Figure 5:
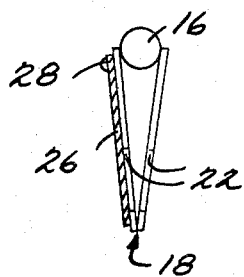
FIGURE 5 is a cross-sectional elevation similar to FIGURE 3 and illustrating a prior art type of vane construction in a position wherein a follower fully closes the openings through the vane.
Figure 7:
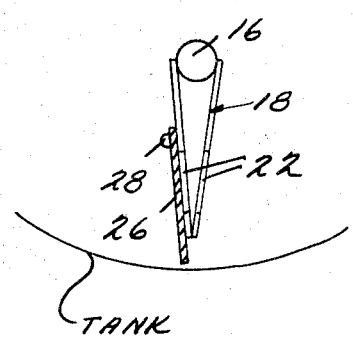
Figure 8:
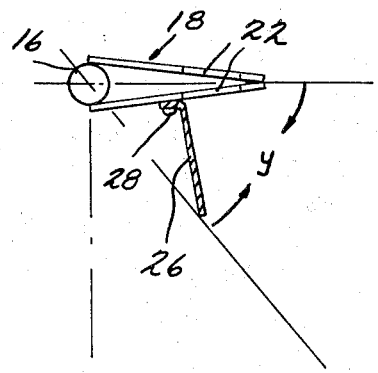

FIGURE 7 is a cross-sectional elevation similar to FIGURE 3 showing an improved vane and follower construction of this invention and illustrating the follower in a closed position relative to openings contained through the vane; and FIGURE 8 is a view similar to FIGURE 5 but showing the improved vane and follower combination in a position wherein the openings contained through the vane are completely opened by the follower.

*Detailed discussion of invention*

Referring to FIGURE 1, the fertilizer tank 10 is shown in a cross-sectional elevation, and the tank may be of any conventional construction and form. Preferably the tank is cylindrical in form with end wall 12. An agitator device is shown generally at 14 and is positioned near the bottom of the tank so that its agitating motions will provide a maximum mixing action to the contents of the tank. The tank is normally filled with a liquid fertilizer medium, and solid material additives may be added to the liquid. Where the solid additives are not soluble in the liquid medium of the fertilizer, particles will settle out near the bottom of the tank if there is no agitation of the mixture, and as a result, there will be an uneven distribution of the additive materials throughout the fertilizer liquid. The agitator device 14 prevents the settling out of solid particles and provides and maintains an even distribution of materials throughout the liquid fertilizer medium.

As shown in FIGURE 1, the agitator device 14 includes a mounting shaft 16 which extends through the length of the tank and which is mounted on opposite end walls 12 of the tank. The shaft carries a vane or paddle means 18 for movement within the liquid medium inside of the tank, and additionally the shaft is connected to a driving means 20 which is located externally of the tank. Therefore, it is necessary that the shaft pass through at least one of the end walls of the tank in order to be connected to the driving means 20. In the preferred embodiment, the shaft passes through both end walls of the tank in order to provide a better and more stable mounting of the shaft and its vane 18 within the tank. As will be described in greater detail below, the shaft 16 and the vane 18, which is rigidly carried on the shaft, are connected for rotary oscillating movement back and forth in the bottom of the tank and about the longitudinal axis of the shaft. The shaft serves as a fixed pivotal axis about which the vane 18 rotates back and forth within a limited range, causing the vane 18 to move back and forth through the liquid medium.

The vane or paddle means 18 acts as an impeller for pushing the contents of the tank about so as to agitate and mix the contents together. In order to provide a more effective mixing and agitating, the vane 18 is provided with a plurality of valve means which control the flow of liquid through the broad surfaces of the vane so that a greater amount of material will be pushed when the vane oscillates in a first direction than when the vane reverses its oscillation in a second direction. The valve means may comprise suitable valve ports and devices to assure a one-way movement of liquid through the vane 18. However, this invention provides for an improved valve means which is reliable in structure and economical in use. The valve means of this invention includes one or more openings completely through the vane itself. These openings 22 permit an easy flow of liquid material through the vane as the vane moves in one direction with the openings open, while preventing a flow of liquid material through the vane when the vane is moved in an opposite direction with the openings closed. The means for opening and closing the openings is shown in the form of a follower 26 which may be a rubber or other flexible material element connected throughout the length of the vane near the pivotal axis of the vane. The rubber follower 26 is shown as being connected to the vane by rivet means 28. The rubber follower is only connected along the upper edge of the vane and is left free at the outside edge 30 of the vane 18 to be free to flex toward and away from a main body 32 of the vane. Thus, the main body 32 of the vane includes a plurality of openings 22 which are opened and closed by the flexible follower means 26 in accordance with the direction of movement of the vane through the tank.

Referring to FIGURES 3 and 4, the relationship of the flexible follower to the main body of the vane is shown for the two directions of oscillating movement of the vane body. In the FIGURE 3 motion, the vane is being moved through the liquid medium about a pivotal axis determined by the shaft 16 so as to place the flexible follower in a trailing position relative to the forward movement of the vane. The opening 22 allows passage of liquid through that opening, and pressure of the liquid against the trailing follower 26 moves the follower away from the openings, and permits an easy movement of the vane through the liquid. With this movement there is little stirring or pumping action by the vane since its broad surface has been substantially reduced in area by the plurality of openings 22.

In the FIGURE 4 movement of the vane in an opposite direction from that shown in FIGURE 3, it can be seen that the flexible follower 26 is in a leading position relative to the forward movement of the vane through the liquid medium, and this leading position causes the follower to be pressed throughout its length against the vane body 32. This action causes the follower to cover all of the plurality of openings simultaneously and to prevent the movement of any liquid through the vane body when the vane is moving in the direction shown in FIGURE 4. The FIGURE 4 movement pumps or stirs considerably more liquid material than the opposite movement described in FIGURE 3. As a result, the back and forth oscillating movement of the vane effectively pumps the contents of the tank about in a single direction corresponding to the direction of movement of the vane in the position shown for FIGURE 4. This pumping or stirring action in a single direction creates a greater agitation and a faster mixing of materials within a liquid medium than heretofore possible with prior devices.

Looking to the view shown in FIGURE 2, the means for driving the vane is indicated generally at 20 and includes an offset connecting arm which drives the vane or paddle through its rotary oscillating movements. The driving means 20 includes an endless chain or belt 34 which may be mounted to a portion of a wheel 36 or turning axle which is associated with the vehicle upon which the tank 10 is mounted. By attaching the chain drive 34 to a portion of the wheel 36, the changes in speed of movement of the vehicle over the terrain will determine the amount of agitation applied to the vane or paddle within the tank 10. The chain drive 34 turns a sprocket wheel 38 and this rotates a rigidly affixed lever arm 40 in a single rotary direction. The lever arm 40 carries a connecting arm 42 at its outer radial portion, and the connecting arm is mounted for pivotal movement in its connection to the lever arm 40. The connecting arm 42 may be a rigid arm interconnected between the lever arm 40 and a second lever arm 43 which is affixed to a portion of the paddle shaft 16 extending externally of the tank 10. However, in the preferred form of this invention, the connecting arm 42 includes a shock absorber means in its connection to the second lever arm 43 so as to absorb reciprocating movements of the arm when there is an extremely high resistance to the initial movement of the vane or paddle 18 within the tank 10. When solutions are used in the tank which contain a high percentage of suspended solids, there is the possibility that enough of the solid material will settle out, under certain conditions, to prevent an easy movement of the vane 18. If the connecting arm 42 is rigidly interconnected between the lever arms or cranks 40 and 43, there is a danger that the initial driving of the connecting arm would cause the paddle to break loose from its mounting shaft 16 when there is an extreme resistance to the movement of the paddle because of solid material settled in the bottom of the tank 10. Accordingly, the connecting rod 42 is mounted so as to pass freely through an end portion of the second lever arm 43. Spring means 44, or other shock absorbing means, are positioned on each side of the connecting arm 42 in its passage through the end portion of the lever arm 43, and the tension of the springs determines the amount of force applied to the agitator paddle within the tank. When the connecting arm 42 is initially driven by the chain means 34, as described above, the reciprocating movements of the arm through a mounting block 45 on the end of the lever arm 43 is relayed to the vane 18. If the vane meets a strong resistance to its initial movement, the connecting arm 42 passes through the mounting block 45 without relaying the motion to the second lever arm 43, and the movement of the connecting arm is absorbed by the compression of the spring means 44 for each direction of the connecting arms reciprocation. In the case of thixotropic materials which may be contained within the tank 10, the relatively gentle application of reciprocate movements to the vane 18 soon causes a sufficient movement of those materials so that more and more of the reciprocating force from the connecting arm 42 is applied to the agitator vane 18. Once the materials are moving freely within the tank, the spring means 44 are of such a strength to cause essentially all of the reciprocating movements to be directly applied to the second lever arm 43 and to the vane within the tank. The mounting block 45 is carried on the end of the second lever arm 43 so as to pivotally move about its point of connection to the lever arm, and it will be seen that rotary movements of the sprocket wheel 38 will relay a back and forth rotary movement to the shaft 16 through the second lever arm 43, as shown by the arrows. The tank 10 is shown as being mounted on a vehicle which may be drawn or driven over the ground, and the tank includes suitable connections for dispensing fertilizer liquid from the tank and into a spraying rig or other dispensing apparatus which is not shown. Clutch mechanisms, of well known constructions may be provided for disconnecting the chain 34 from the turning movement of the vehicle's wheels, and this permits the tank to be carried by the vehicle for highway travel when no mixing is desired. Also, it is contemplated that hydraulic shock absorbers may be used in place of the illustrated springs 44.

Referring again to the cross section shown in FIGURE 1, it can been seen that it is necessary to seal the shaft 16 between the interior of the tank and the exterior where the opposite ends of the shaft pass through the end walls 12. It is possible to provide various types of sealing rings and gaskets for mounting the shaft through end walls 12, but it has been found that a very reliable and long wearing sealing means is provided in the form of a flexible boot means 48 which seals each end of the shaft 16 from leakage of the liquid contents of the tank through the end wall mountings of the shaft. The flexible boot 48 is essentially cone-shaped with the larger diameter portion of the cone being bolted or otherwise sealed about the wall opening 50 through which the shaft 16 extends. The preferred mounting of the shaft includes an end plate 52 which includes suitable bearing means 54 for carrying the load of the shaft. Also, the plate 52 provides for a clamping plate to hold the flexible boot 48 in tight engagement against the wall 12 around the perimeter of the passageway 50. The smaller diameter portion of the flexible boot is clamped to the shaft body as shown at 56. The clamp may be in the form of a ring or other device which can be tightened to hold the flexible boot material in tight engagement around the entire surface of the shaft 16. The flexible boot may be made of a rubber or plastic material which is of sufficient strength to withstand the pressures of the liquid within the tank 10 and which can withstand the corrosive characteristic of the particular material carried in the tank 10. Since the shaft 16 reciprocates back and forth in a rotary plane, the flexible boot will be flexed back and forth within the range of reciprocation for the shaft. By selecting the right dimensions for the boot as related to the range of movement anticipated for the shaft, there will be an easy movement of the shaft back and forth without stressing or tearing the material of the flexible boot.

Figure 6:
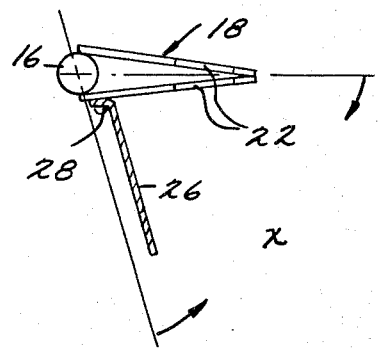
FIGURE 6 is the prior art vane construction of FIGURE 5 when it has moved to a position for fully opening the openings in the vane.

FIGURES 5 and 6 compare prior art vane and follower constructions to an improved vane and follower combination of this invention as illustrated in FIGURES 7 and 8. In the prior art type of construction, and as already discussed for FIGURES 3 and 4, a vane member 18 is mounted on a shaft 16 so that the vane can be oscillated back and forth about a longitudinal axis of the shaft 16 when the shaft is driven. Also, the combination includes a follower 26 which is secured to the vane on one surface thereof by the securing means 28. The conventional location for the securing means 28 is illustrated as being very close to the axis of rotation for the vane (that is, the longitudinal axis of the driven shaft 16). Thus, when the vane of FIGURE 5 moves to a limit position of oscillation as shown in FIGURE 6, the follower 26 is free to fall away from openings 22 which are provided through the vane. In this way, the follower functions to open the openings 22 during a rotational movement of the vane in a counterclockwise direction from the position shown in FIGURE 5, and the position of the vane in FIGURE 6 represents a limit position at the end of such a counterclockwise movement of the vane. When very viscous or dense materials are being mixed, it can be seen that a return movement of the vane from the FIGURE 6 position, and in a clockwise direction, will ultimately result in a closing of the openings in the vane by the follower 26. This closing of the openings is a desired condition for the return movement of the vane, as already discussed, but where a very viscous material is being mixed, the vane of FIGURE 6 must move for nearly 90 degrees (or through the angle $x$) before the vane is in contact with the follower for closing the openings therethrough. The density of material acts to fix the position of the follower in the approximate position shown for FIGURE 6, and therefore, the vane must move for almost 90 degrees to arrive at the follower position. This arrangement substantially reduces the agitating action which is expected from a vane and follower combination.

Referring to FIGURES 7 and 8, an improved vane and follower construction is illustrated wherein the follower 26 is mounted to the vane 18 at a point which is remote from the axis of rotation for the vane. The mounting means 28 are provided at points just above the openings 22 which are formed through the vane, and this arrangement provides for a novel opening and closing of the follower 26 relative to rotational movements of the vane about the longitudinal axis of the mounting shaft 16. Looking to the FIGURE 8 position of the improved vane and follower, as compared to the FIGURE 6 position of the prior art, it can be seen that the improved vane rotates for a much shorter distance for effecting a closing of the openings 22 by the follower 26. As with the FIGURE 6 arrangement, the follower 26 of FIGURE 8 is substantially fixed in the position shown by a very dense or viscous material, and this requires a movement of the vane toward the position of the follower to effect a closing of openings in the vane. It has been found that with the improved mounting of a follower to a vane a complete closing of openings in the vane takes place in approximately 45 degrees of rotational movement in a clockwise direction, and this assures a complete closing of the vane for a remaining 45 degrees of rotation to a completely upright position of the vane and follower in the tank. The angle $y$ represents the approximate movement of the improved vane which is required to close the follower 26 over openings through the vane. This improvement becomes very significant when a total range of oscillating movements of a vane is less than 180 degrees. It is preferred in some constructions to oscillate a vane for only 90 degrees back and forth about its mounting axis, and the significance in accomplishing a closing of openings through the vane for at least 45 degrees of such movement should be apparent. The mounting means 28 of the improved construction may be placed at any convenient point away from the axis of rotation for the vane, and in the illustrated embodiment the mounting means are placed at an approximate midpoint between the axis of rotation of the vane and a terminal edge of the vane.

A further improvement in a vane and follower combination is illustrated in the FIGURES 7 and 8 wherein a free edge of the follower 26 is illustrated as extending beyond a terminal edge 30 of the vane. This provides for an agitating acition of the vane and follower combination right up to the inner wall of a tank in which they may be mounted, and there is no danger of the vane itself contacting or scraping against the inner wall surface of the tank. The extended follower provides for an improved agitating action which serves to move all materials which may be settled at the bottom of a tank.

Having described the invention, it will be seen that the agitator device provides an improved means for rapidly mixing materials within a tank and for maintaining a state of suspension of such materials once they are mixed. The novel sealing means used in combination with the reciprocating shaft of this invention eliminates the disadvantages found with more complex sealing devices which are subject to wear and possible leakage, and which have been common in the prior art. Certain variations of this invention will become apparent to those skilled in the art, and such variations are intended to be within the scope of the invention as described in the following claims.

What is claimed is:

1. Liquid agitating apparatus for mixing liquid material comprising:
   a tank for holding the liquid material which is to be mixed,
   an agitator means contained within said tank for mixing and agitating the liquid material, said agitator means having:
      a vane means positioned at the bottom of the tank and mounted for oscillatory movement through the liquid material, and one-way valve means through said vane means for allowing passage of liquid through said vane in one direction only whereby for each oscillation of said vane in a first direction more material is moved by the vane than for each return oscillation of the vane in a second direction,
   driving means for oscillating the vane back and forth through the liquid material wherein said driving means is mounted externally of said tank and comprises:
      a driven shaft means connected to said agitator means through an upright wall of said tank and at a level which is below the liquid level within the tank, said driven shaft means being further connected to a crank externally of the tank for reciprocating said agitator means within the tank, said driven shaft means being spring mounted in its connection to said crank, whereby said spring mounting means will be compressed so as to absorb the driving movements of said driven shaft when the contents of the tank have settled around said agitator means so as to resist initial movement of the agitator, and
   a sealing means included within said tank and around said driven shaft means, said sealing means comprising a flexible boot means which completely encircles said driven shaft means and which is attached to said driven shaft means and to an inner wall surface of the tank to form a liquid seal around the driven shaft means where said shaft means passes through the upright wall of the tank.

2. The apparatus of claim 1 wherein said valve means comprises at least one perforation through said vane, and a follower means for closing said perforation, said follower means being mounted to flex in positions which close and open the perforation in response to fluid pressure on the follower means, whereby the follower is pressed over said perforation in a closing position when the vane is oscillated in said first direction and said follower is moved away from said perforation to an opening position when said vane is oscillated in the second direction.

3. The apparatus of claim 1 wherein said driven shaft is spring mounted with separate spring means on each side of its connection to said crank, whereby the separate spring means will absorb movements of said shaft in either direction of its reciprocation when there is an extreme resistance within the tank preventing movement of the agitator means.

4. The apparatus of claim 1 wherein said apparatus is carried on a vehicle and wherein said driving means is driven at a speed which is related to the speed of movement of a vehicle carrying said dispensing apparatus over the ground.

5. In a liquid mixing apparatus for mixing liquid material wherein a vane means is mounted within a tank containing the liquid material to be mixed, said vane means being mounted on a driven shaft for causing oscillatory movements of the vane back and forth about a longitudinal axis of the shaft, and wherein said vane means includes a valving means therethrough for substantially preventing a flow of liquid material through the vane when the vane is oscillated in a first direction while permitting a flow of liquid material through the vane when the vane is oscillated in an opposite direction, the improvement in said vane means and said valving means comprising:

at least one opening through said vane means for permitting a flow of liquid material through said vane means, a follower means attached to said vane means for closing said opening when the vane is moved in said first direction and for opening said opening when the vane is moved in said opposite direction, said follower means further having a free end and an attached end, said attached end of the follower means being fixed to said vane at a point intermediate said longitudinal axis of said driven shaft and an outer edge of said vane means, said free end of the follower means extending beyond a terminal edge of said vane means, whereby said follower means is caused to close said opening when said vane is moved in said first direction and away from an extreme limit position of said opposite direction of movement.

6. In a liquid mixing apparatus for mixing liquid material wherein a vane means is mounted within a tank containing the liquid material to be mixed, said vane means being mounted on a driven shaft for causing oscillatory movements of the vane back and forth about a longitudinal axis of the shaft, and wherein said vane means includes a valving means therethrough for substantially preventing a flow of liquid material through the vane when the vane is oscillated in a first direction while permitting a flow of liquid material through the vane when the vane is oscillated in an opposite direction, the improvement in said vane means and said valving means comprising:

at least one opening through said vane means for permitting a flow of liquid material through said vane means, a follower means attached to said vane means for closing said opening when the vane is moved in said first direction and for opening said opening when the vane is moved in said opposite direction, said follower means further having a free end and an attached end, said attached end of the follower means being fixed to said vane at a point intermediate said longitudinal axis of said driven shaft and an outer edge of said vane means, whereby said follower means is caused to close said opening when said vane is moved in said first direction and away from an extreme limit position of said opposite direction of movement, a driving means for oscillating said vane means back and forth through said liquid material, said driving means being mounted externally of a tank means in which said vane means is located, said driving means including a crank and shaft means for driving the driven shaft upon which said vane means is mounted, and a sealing means located within said tank and around said driven shaft, said sealing means comprising a flexible boot means which completely encircles said driven shaft means and which is attached to said driven shaft means and an inner wall surface of the tank to form a liquid seal around the driven shaft means where said shaft means passes through the upright wall of the tank.

7. In a liquid mixing apparatus for mixing liquid material wherein a vane means is mounted within a tank containing the liquid material to be mixed, said vane means being mounted on a driven shaft for causing oscillatory movements of the vane back and forth about a longitudinal axis of the shaft, and wherein said vane means includes a valving means therethrough for substantially preventing a flow of liquid material through the vane when the vane is oscillated in a first direction while permitting a flow of liquid material through the vane when the vane is oscillated in an opposite direction, the improvement in said vane means and said valving means comprising:

at least one opening through said vane means for permitting a flow of liquid material through said vane means, a follower means attached to said vane means for closing said opening when the vane is moved in said first direction and for opening said opening when the vane is moved in said opposite direction, said follower means further having a free end and an attached end, said attached end of the follower means being fixed to said vane at a point intermediate said longitudinal axis of said driven shaft and an outer edge of said vane means, whereby said follower means is caused to close said opening when said vane is moved in said first direction and away from an extreme limit position of said opposite direction of movement, a driving means for oscillating said vane means back and forth through said liquid material, said driving means being mounted externally of a tank means in which said vane means is located, said driving means including a crank and shaft means for driving the driven shaft upon which said vane means is mounted, said shaft means for oscillating said crank having a shock absorbing means for absorbing initial driving movements of said shaft means relative to said crank when the contents of the tank have settled around said vane means to the extent of preventing immediate full movements of said vane.

8. In a liquid mixing apparatus for mixing liquid material wherein a vane means is mounted within a tank containing the liquid material to be mixed, said vane means being mounted on a driven shaft for causing oscillatory movements of the vane back and forth about a longitudinal axis of the shaft, and wherein said vane means includes a valving means therethrough for substantially preventing a flow of liquid material through the vane when the vane is oscillated in a first direction while permitting a flow of liquid material through the vane when the vane is oscillated in an opposite direction, the improvement in said vane means and said valving means comprising:

at least one opening through said vane means for permitting a flow of liquid material through said vane means, a follower means attached to said vane means for closing said opening when the vane is moved in said first direction and for opening said opening when the vane is moved in said opposite direction, said follower means further having a free end and an attached end, said attached end of the follower means being fixed to said vane at a point intermediate said longitudinal axis of said driven shaft and an outer edge of said vane means, whereby said follower means is caused to close said opening when said vane is moved in said first direction and away from an extreme limit position of said opposite direction of movement, a driving means for oscillating said vane means back and forth through said liquid material, said driving means being mounted externally of a tank means in which said vane means is located, said driving means including a crank and shaft means for driving the driven shaft upon which said vane means is mounted, and said apparatus being carried on a vehicle wherein said driving means can be driven at a speed which is related to the ground speed of said vehicle.

9. The improvement of claim 5 wherein said point of attachment for said follower is at an approximate midpoint between said longitudinal axis and said outer edge of the vane means.

10. The improvement of claim 5 wherein said vane means includes a plurality of openings therethrough and wherein a follower means is provided for each opening.

11. The improvement of claim 10 wherein a single follower means opens and closes all of said plurality of openings.

12. The improvement of claim 7 wherein said shock absorbing means comprises a compressible spring mounted on said second named shaft so as to drive said crank means.

13. The improvement of claim 8 and further including dispensing apparatus for dispensing liquid material from said tank after it has been mixed.

References Cited

UNITED STATES PATENTS

| | | | |
|---|---|---|---|
| 858,103 | 6/1907 | Place | 259—101 |
| 916,152 | 3/1909 | Hoeglauer | 259—101 |
| 2,164,277 | 6/1939 | James | 259—101 |
| 2,229,238 | 1/1941 | Cash | 259—101 |
| 2,263,593 | 11/1941 | Richards | 259—101 |
| 2,553,403 | 5/1951 | Cory | 259—101 |
| 2,561,213 | 7/1951 | Mahowald | 68—133 |

ROBERT W. JENKINS, *Primary Examiner.*